(12) United States Patent
Champagne et al.

(10) Patent No.: US 7,143,169 B1
(45) Date of Patent: Nov. 28, 2006

(54) METHODS AND APPARATUS FOR DIRECTING MESSAGES TO COMPUTER SYSTEMS BASED ON INSERTED DATA

(75) Inventors: Jean-Philippe Champagne, Goleta, CA (US); James A. Aviani, Santa Barbara, CA (US); Joshua Miles Chase, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 658 days.

(21) Appl. No.: 10/116,225

(22) Filed: Apr. 4, 2002

(51) Int. Cl.
*G06F 15/173* (2006.01)
*G06F 15/16* (2006.01)

(52) U.S. Cl. ..................... 709/226; 709/227
(58) Field of Classification Search ............... 709/226, 709/227–229, 230–237
See application file for complete search history.

(56) References Cited

U.S. PATENT DOCUMENTS

| | | | | |
|---|---|---|---|---|
| 5,931,916 A | * | 8/1999 | Barker et al. | 709/239 |
| 6,006,264 A | * | 12/1999 | Colby et al. | 709/226 |
| 6,374,300 B1 | * | 4/2002 | Masters | 709/229 |
| 6,611,873 B1 | * | 8/2003 | Kanehara | 709/238 |
| 6,732,175 B1 | * | 5/2004 | Abjanic | 709/227 |
| 6,823,391 B1 | * | 11/2004 | Deen et al. | 709/229 |
| 2003/0065711 A1 | * | 4/2003 | Acharya et al. | 709/203 |

OTHER PUBLICATIONS

IP Network Address Translation, by Michael Hasentein, 1997, "http://hasenstein.com/linux-ip-nat/diplom/nat.html".*

* cited by examiner

*Primary Examiner*—Glenton B. Burgess
*Assistant Examiner*—Philip S. Scuderi
(74) *Attorney, Agent, or Firm*—Chapin IP Law, LLC; Barry W. Chapin, Esq.

(57) ABSTRACT

Mechanisms and techniques provide a system that operates in a data communications device such as a switch or a router to provide a technique for load balancing packets between computer systems based on extra data inserted in the packets. The system receives a message containing extra data. The extra data was inserted into the message by a second data communications device existing in a network coupling the first data communications device to a first computerized device that originated the message. The system identifies, based on the extra data inserted into the message, a second computerized device that is to process the message and forwards the message to the second computerized device for processing. The extra data can include demographic data that can be used to select a demographic server, and for selection of a specific server from a group of servers associated with the demographic server.

12 Claims, 5 Drawing Sheets

METHODS AND APPARATUS FOR DIRECTING MESSAGES TO COMPUTER SYSTEMS BASED ON INSERTED DATA

RELATED APPLICATIONS

This invention is related to technology disclosed in a co-pending United States Application for Patent entitled "Methods and Apparatus for Inserting Data into a Communications Session", having Ser. No. 10/044,216, Filed Nov. 20, 2001, and which shares co-inventorship, with the same Assignee as the present Application for Patent. The entire teaching and contents of this referenced patent application are hereby incorporated by reference herein in their entirety.

BACKGROUND OF THE INVENTION

Computer and communications networks such as the Internet allow computer systems to exchange information using various data communications protocols. One common protocol in widespread use that provides for a reliable exchange of information in packets between computer systems in such a network is the Transmission Control Protocol or TCP. TCP is a connection oriented protocol that allows two computer systems to each maintain a connection state for a communications session that uses an underlying protocol such as the Internet Protocol (IP) in a network to deliver packets between the two computer systems involved in the communications session. The connection state maintained by each computer system according to TCP supports reliable delivery of the packets by detecting, for example, loss or corruption of a particular packet in the communications session, or the arrival of packets out of order from the order in which they were transmitted from the sending or originating computer system. TCP also prevents an application from receiving duplicate packets.

At the beginning of a TCP communications session between two computer systems, the computer systems exchange certain TCP synchronization (SYN), synchronization acknowledgment (SYN ACK) and synchronization acknowledgment acknowledgment (SYN ACK ACK) messages which allow those computer systems to begin the TCP communications session at the same starting point. The initiation procedure thus allows each computer to thereafter properly track and update the TCP connection state based on the transmission and receipt of packets sent and received during that TCP session that contain certain TCP specific information. In particular, each packet transmitted as part of the TCP communications session between the computer systems includes a TCP header portion that identifies, among other things, sequence information in the form of a sequence number for that packet. Each byte of data transmitted by a computer system for that TCP session has a unique sequence number. The sequence number portion of a TCP header is sufficiently long (e.g., 32 bits) such that duplicate sequence numbers will long since have vanished by that time the sequence of sequence numbers must wrap around to start over. Accordingly, when a computer system places data into a packet to be transmitted using the TCP communications session, the sequence number is updated immediately prior to transmission of that packet to reflect the current total number of bytes of data transmitted from this computer system thus far during this TCP communication session.

A TCP header for a packet transferred during a TCP communications session can also contain acknowledgment information in the form of a numerical acknowledgment that allows the computer sending an outbound packet to acknowledge receipt of a cumulative number of total bytes of data received thus far, including a most recent former inbound packet sent from the other computer system in the communications session. In other words, sequence number information in a TCP header identifies the current byte count of bytes transmitted from a computer system, whereas acknowledgment number information provides an acknowledgment to the other computer system of how many bytes have actually been received thus far by this computer system. Accordingly, a two computer systems involved in a TCP communications session can use acknowledgment and sequence number information to detect corrupted or lost data. In such cases, a computer system can retransmit a packet of data for which an acknowledgment is either not received or which indicates an incorrect amount of data that was received based on comparison of the acknowledgment information with the sequence number information.

In addition to sequence and acknowledgment information, the TCP header portion of a packet associated with a TCP communications session also contains error correction information in the form of a checksum value that is computed based on the entire contents of the packet. A computer system involved in a TCP communications session that receives a packet can access the checksum value to compare this value with a checksum computed in real time during receipt of the packet to ensure that the packet was properly received. The TCP header can also contain a TCP header length field that identifies how much data is in this particular packet (or in this TCP header).

Using the aforementioned information within a TCP header, if a computer system involved in a TCP communications session transmits a packet containing a valid TCP header and that packet experiences corruption (e.g., an error or change in the packet information is introduced during its transmission) as it travels through the computer network from the sending computer system (e.g., a client) to a recipient computer system (e.g., a server), the communications session state maintained by the sending and recipient computer systems can be used by TCP to detect this disruption using the aforementioned techniques. It may be the case, for example, that a noisy transmission link over which the packet traveled on route to the recipient computer system altered one or more bits settings within the packet or introduced additional data into the packet or removed existing data within the packet. As a result, the recipient computer system might detect a checksum error or alternatively, might detect that the sequence number specified in the TCP header for that packet does not properly correspond with the number of bytes received in a packet.

Another technology related to the present invention is called load balancing. Load balancing allows a network device (referred to as a load balancer) that receives a message, such as a packet of data, to forward the message to a particular computer system selected from a variety of computer systems that might each be capable of processing the message. As an example, in a computer network such as the Internet, a web site may include a plurality of server computer systems configured to serve web pages on behalf of the web site. Any one of the server computer systems can process client (e.g., web browser) requests for web pages related to the web site. The web site can include a load balancing network device such as a content switch or router that operates as an access point or entry point to the web site on the Internet. The load balancer can advertise itself using the network address of the web site such that other data communications devices (e.g., routers and switches) within the Internet operate (i.e., via routing algorithms) to direct all content requests for web pages (e.g., HTTP GET requests) for the web site to the load balancer.

The load balancer can operate a load balancing technique or algorithm in order to evenly distribute such requests for data (e.g., client requests for web pages) to each of the server computer systems associated with the web site. In this manner, no one particular server computer system is overwhelmed with requests for data more than any other server computer system within the web site. A typical conventional load balancing algorithm can use a round-robin or weighted fair queuing technique in order to evenly distributed requests for data amongst the available server computer systems capable of serving the requested data.

SUMMARY OF THE INVENTION

Due to the robustness of connection oriented communications protocols such as TCP, such protocols do not allow for the modification of the contents of one or more packets of data being transmitted through a computer network using one of these protocols. As an example, if a conventional network data communications device accidentally modified a data or header portion of a packet that resulted in injecting or inserting extra data into the packet, this packet would be rejected by a recipient computer system such as a web server for a number of reasons. Rejection might occur because the checksum information in the packet might not matched a checksum computed on the packets contents upon receipt of the packet. In addition, the TCP sequence and acknowledgement information within this packet would be offset or skewed by the accidental insertion of additional data. As a result, the recipient computer system (e.g., a web server) would acknowledge, to the client computer system that originated the packet, receipt of more data than the client actually sent. This would disrupt the TCP communications session between the client and server.

These aspects of TCP are often cited as security features since conventional attempts at modification of packet data for packets transferred using the TCP protocol result in the disruption of sequence and acknowledgment information and error correction or checksum information associated with the connection state of the communications session using the TCP protocol. As a result of this difficulty, applications that desire to rely on the insertion of additional data into a communications session or to modify existing data transferred between two upper layer software applications operating on computer systems involved in a TCP communications session must perform such packet modifications within either the sending or receiving computer system prior to the creation of the TCP packet header so as not to interfere with the TCP communications session state information. That is, mid-stream or post-transmission modifications to TCP packets as those packets propagate through a computer network are typically not performed or allowed by conventional data communications devices or data transmission systems in order to avoid disruption to the TCP communications session state required or expected by the end-to-end computer systems that share the connection.

As a result of the inability to insert data into packets of a communications session while those packets are traveling over a network (e.g., after their transmitted by a client), conventional load balancing technologies such as those employed in a web site are unable to perform load balancing based on information such as extra data inserted into a packet associated with that communications session. Conventional load balancing systems may take into account attributes of incoming requests for data that are generated by client computer systems in order to make a load balancing decision (e.g., load balancing based on a source address of the packets), but the information (e.g., a source address) upon which the load balancing decision is made is produced or generated by the computer system that originated the packet and is not inserted into the packet such that packet size is changed. That is, when a conventional load balancer receives a message such as a TCP connection establishment message (i.e., a TCP SYN) sent from a client computer system, the conventional load balancer can examine or look into the contents of the message in order to determine characteristics of the message such as the identity (e.g., network address) of the client computer system that originated the message in order to make a load balancing decision as to which server computer system is to handle the incoming TCP connection from the requesting client computer system.

Other conventional load balancing devices known as content switches or content routers are capable of examining other aspects of a message, such as parts of a Uniform Resource Locator (URL) contained within an HTTP GET request message. However, since conventional techniques for handling establishment and maintenance of TCP connections between a client and server computer system do not allow modification of messages by adding extra data in those messages once they are transmitted from a client computer system and travel over a network on route to a destination computer system, conventional techniques for load balancing do not take into account information that could be provided by mid-stream devices such as data communications devices through which the message may propagate during transmission of the client computer system to the load balancer.

In contrast, embodiments of the invention use the insertion technology disclosed in the aforementioned related patent application to insert information into packets of data as the travel through a network. Upon receipt of a packet containing inserted information, a load balancing decision can be performed, based on the inserted data, in order to select a computer system to process the message within, for example, a web site to which the message is sent over the network.

As an example, many client computer systems connect to computer networks such as the Internet by connecting or dialing into a local (i.e., geographically, with respect to the client) Internet Service Provider (ISP) facility. The ISP facility may provide a Network Access Server (NAS) that includes client connection hardware such as a modem bank or broadband hardware (e.g., DSL DSLAM hardware, cable modem hardware, etc.) that the client computer system interoperates with to couple to the Internet. The link between the client computer system and the ISP facility is commonly referred to as the "last mile link" or the "network edge" because client computer systems are typically located in relatively close geographic proximity to the ISP facility (e.g., within the same town or county) and the connections terminate in the client. Embodiments of the present invention are based in part on the observation that it can prove beneficial to a group of recipient computer systems, such as a web site containing many servers, to be aware of such things as demographic information related to the client computer system (or its user) and/or the physical or geographical location or approximate location of a client computer system that transmits content requests to the web site. Web sites equipped with embodiments of this invention can use such extra inserted data or information for load balancing purposes in addition to performing such things as targeted advertising or for authentication or security purposes.

Using conventional technologies, short of modifying client computer system software (i.e., upgrading web browser software) to automatically include an identity of a location in which that client computer system resides within a message sent from that client to a server computer system, conventional technologies do not allow a network device such as a NAS device or edge router or switch in an ISP facility to tag or otherwise insert location or demographic information (i.e., extra data) into an outbound message sent from a client to a server device which can then be interpreted by a load balancing device associated with a web site in order to load balance that message to a particular selected server computer system. In other words, conventional technologies do not perform load balancing techniques based on information or extra data inserted into messages that are in transit between, for example, a client and server computer system, once those message have been transmitted onto the network from the client computer system.

As briefly noted above, embodiments of the invention provide techniques and mechanisms to perform load balancing based on a process of data insertion or modification of data in one or more packets or messages associated with a connection such as a TCP communications session. Such data insertion or modifications, upon which load balancing decisions are made, can take place in "mid-stream" after creation and transmission of a message or packet form a client computer system as that packet propagates through a computer network such as the Internet towards its destination, such as web server. The load balancing decision that is made according to embodiments of the invention is based on the modification and/or insertion of existing or extra data into one or more messages that the device (i.e., a load balancing device) receives.

In particular, embodiments of the invention rely on technology disclosed in the aforementioned reference co-pending United States Application for Patent entitled "Methods and Apparatus for Inserting Data into a Communications Session". This reference patent application discloses technology that includes a device, such as a data communications device (e.g., switch, router, hub, bridge, gateway, edge device, NAS device or the like) which assists in propagating or transporting a packet through a computer network and is able to insert or otherwise modify data in the data payload or other portions of the packet without disrupting a communications session state maintained by the sending and receiving computer systems that are exchanging this packet in a communications session.

As a example of this enabling technology, a sending computer system such as a client can transmit a packet of data over a TCP communications session and a data communications device equipped with the insertion technology disclosed in the reference patent application can modify the contents of that packet such as, for example, by adding extra data that includes load balancing information or other information into the packet, can then continue to forward that packet which now contains the extra data on towards its original recipient computer system. As will be explained, the sending and recipient computer systems need not require any knowledge that any modification was made to the packet from its original form.

As an example of the usefulness of embodiments of the invention, a data communications device equipped with an embodiment of the invention can, for instance, intercept a packet associated with a TCP communications session and can encode or otherwise insert load balancing information that may include demographic and/or geographical or physical location information into the original TCP packet. This operation may, for example, increase the size of the original packet by a certain number of bytes. Prior to retransmission of this packet further towards its intended recipient computer system, the data communications device equipped the technology of the referenced Patent Application can make adjustments to TCP sequence information, acknowledgment information, error correction information (e.g., checksum information) and packet length information within the packet in order to appropriately adjust the TCP connection information associated with that packet so as to not disrupt or disturb the TCP communication session state maintained by the sending (e.g., client) and receiving (e.g., server) computer systems. The recipient computer system (e.g., the server) can thus receive the modified packet without error and without disruption to the TCP connection state associated with the communications session over which that packet arrived. The device that inserts data in this manner is capable of tracking the amount of extra data inserted into, or modified within, packets associated with the communications session and is able to adjust connection information associated with all other packets transmitted over the communications session after the insertion or modification take place such that the computer systems which operate as the endpoints communications session do not experienced disruption to the insertion or modification of data.

In other words, once insertion of extra data or modification of data to one or more packets in a communications session takes place in order to insert, for example, load balancing information into such packets, the technology disclosed in the aforementioned referenced Patent Application causes the device that inserted the data to continually modify connection information (e.g., TCP sequence and acknowledgment information, checksum information or other information) within all other packets transmitted over the network that are associated with that communications session such that connection state for the communications session maintained by the end computer systems such as a client and server does not become disrupted.

Embodiments of the present invention reside within data communications devices such as load balancing devices that receive one or more packets of data that contain the inserted extra data (i.e., that contain load balancing information) inserted by another data communications device equipped with the data insertion technology discussed above. Devices equipped with the invention are capable of examining the extra data that exists within packets arriving at the device and can make load balancing decisions based upon extra data in order to determine or select a particular computer system that is to service or process the messages containing extra data. Since the extra data is not inserted into the messages by the client but rather, is transparently inserted by a data communications device associated with that client (e.g., a data communications device in that client ISP facility), the client and its associated software need not be modified to take advantage of operations of the invention. The extra data can contain load balancing criteria that allow data communications devices such as a load balancers equipped with the invention to select a particular web server or group of servers based upon the extra data inserted into the messages associated with an existing or incoming data communications session from that client.

In particular, embodiments of the invention provide methods and apparatus for processing messages associated with a communications session between a first and second computerized devices. One embodiment operates in a first data communications device and performs the steps of receiving a message containing extra data. The extra data is inserted into the message by a second data communications device existing in a network coupling the first data communications device to a first computerized device that originated the message. The embodiment identifies, based on the extra data inserted into the message, a second computerized device that is to process the message and then forwards the message to the second computerized device for processing.

In another embodiment of the invention, the message includes connection information that the second data communications device modified during the process of inserting the extra data such that a connection over which the message is transmitted between the first computerized device and the second computerized device is not disrupted by the insertion of the extra data into the message by the second data communications device.

In a further embodiment, the message is a connection establishment message originated by a client browser application operating on the first computer system and the extra data includes a load balancing characteristic associated with the first computer system that the second data communications device inserts into the connection establishment message. Also, the step of identifying a second computerized device that is to process the message comprises the steps of utilizing the load balancing characteristic included in the extra data to select the second computerized device from a plurality of second computerized devices that are capable of processing the message. The second computerized devices are computerized devices such as a group of servers in a web site to which the step of forwarding forwards the message in order to establish a connection with the first computerized device (e.g., a client).

In another embodiment, the extra data is geographic data that indicates a geographic location associated with the first computerized device. The step of identifying selects a second computerized device that is geographically preferred to handle a connection from the first computerized device. In this manner, a device equipped with the invention can perform load balancing by detecting inserted geographic information in packets.

In still another embodiment, the step of forwarding comprises the step of forwarding the message containing the extra data, and including the modified connection information, to the second computerized device such that the second computerized device (e.g., a selected web server) can process the message in conjunction with the extra data inserted into the message by the second data communications device without disruption to the connection between the first and second computerized devices.

In yet another embodiment, the step of receiving a message containing the extra data comprises the steps of extracting the extra data from the message and adjusting the connection information included within the message such that the message no longer contains the extra data and is reverted to a state that existed before the second data communications device inserted the extra data into the message. In this particular embodiment, the first data communications device removes the extra data inserted by the second data communications device and the server knows nothing of the insertion that takes place. Also, the step of forwarding comprises the step of forwarding the message without the extra data to the second computerized device for processing. This way, load balancing can be done using the extra data which is then removed from the message and the original message is sent to a server selected based on the load balancing using the extra data.

In another embodiment, the step of identifying a second computerized device comprises the step of obtaining the extra data from the message and comparing the extra data to routing criteria to select an identity of a second computerized device, from a plurality of second computerized devices that are capable of processing the message. The identified second computerized device is the device to which the step of forwarding forwards the message. In this embodiment, the extra data is left in the message and can be used by the selected second computerized device.

In still another embodiment, the routing criteria is load balancing information that indicates a relative load metric (e.g., performance characteristic) for each of the second computerized devices in the plurality of second computerized devices. Furthermore, the step of comparing comprises the step of selecting an identity of a second computerized device that has a preferred relative load metric such that the step of identifying a second computerized device performs load balancing between each of the plurality of second computerized devices. Thus servers that report load balancing metrics from a router or switch equipped with this embodiment of the invention can be included in the load balancing decision.

In another embodiment, the extra data inserted into the message by the second data communications device includes a demographic server identification (e.g., a demographic key) that identifies a demographic server that maintains demographic information associated with the first computerized device that originated the message. The routing criteria indicates groups of second computerized devices (i.e., servers) associated with respective demographic servers. The step of comparing the extra data to routing criteria to select an identity of a second computerized device comprises the steps of identifying a demographic server corresponding to the demographic server identification included in the extra data and selecting, from the groups of second computerized devices indicated by the routing criteria, a specific group of second computerized devices associated with the identified demographic server. The method then identifies one second computerized device from the selected specific group of second computerized devices associated with the demographic server corresponding to the demographic server identification (i.e., the key) included in the extra data, such that the step of forwarding forwards the message to the identified second computerized device. Thus, if groups of servers in a web site are associated with different demographic servers, a demographic key inserted into a message such as a content request can be routed to a server in the appropriate group of servers based on which demographic server received demographic information related to the content request. As will be explained, the demographic information is provided to the demographic server out-of-band by the second data communications device that inserted the demographic key into the message.

In yet another embodiment, the extra data inserted into the message by the second data communications device includes a demographic key associated with the first computerized device (e.g., associated with a client). The demographic key corresponds to demographic information related to the first computerized device (the client) that the second data communications device forwards to the demographic server corresponding to the demographic server identification contained in the extra data.

Other embodiments of the invention include a computer system, such as a data communications device, computerized device, or any other device configured with software and/or circuitry to process and perform all of the method operations noted above and disclosed herein as embodiments of the invention. In such embodiments, the device, such as a data communications device (e.g., switch, router, dedicated data communications device, hub, or load balancing device specifically designed to perform operations associated with embodiments of the invention), comprises one or more communications interfaces (e.g., physical or wireless network interfaces), a memory (e.g., any type of computer readable medium, storage or memory system), a processor and an interconnection mechanism connecting the communications interface(s), the processor and the memory. In such embodiments, the memory system is encoded with a message manager application that when performed on the processor, produces a message manager process that causes the computer system to perform any and/or all of the method embodiments, steps and/or operations explained herein as embodiments of the invention. In other words, a computer, switch, router or other device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application and/or process(es), such as a data communications device operating system configured to operate a load balancing technique as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein as embodiments of the invention. Such arrangements of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software and/or firmware or other such configurations can be installed or loaded onto a computer system, data communications device or other device and when such embodiments are executed, run, interpreted or otherwise perform, they cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, application or process (and an encoding thereof on a computer readable medium such as a disk), as software and hardware, or as hardware and/or circuitry alone. The features of the invention, as explained herein, may be employed in data communications devices and other computerized devices and software systems such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Figure 1:
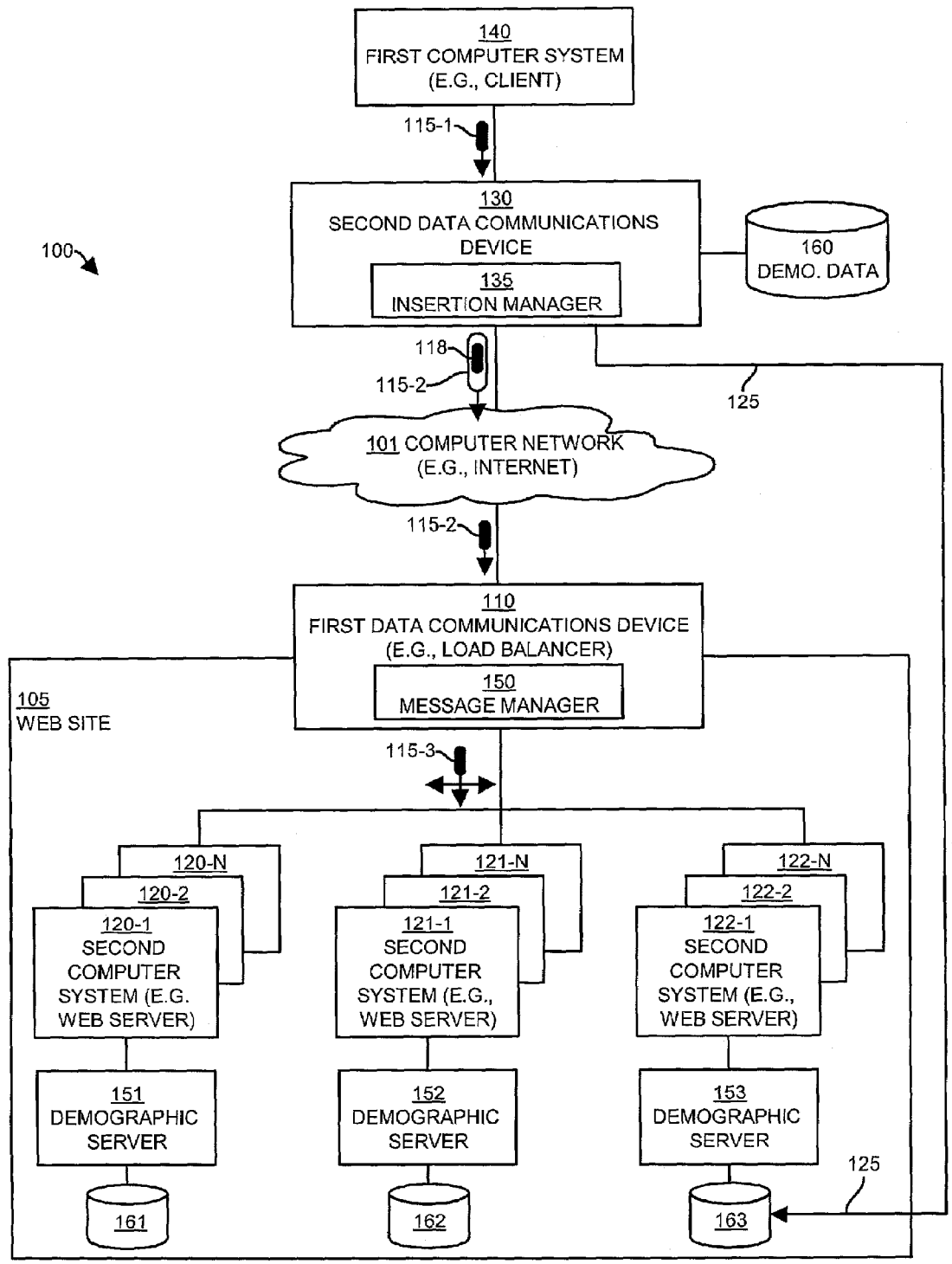
FIG. 1 illustrates an example exchange of packets in a communications session between a first and second computerized device in which a message manager configured according to embodiments of the invention detects extra data and performs load balancing based on this extra data in a message.

FIG. 1 illustrates an example of a computer system environment 100 suitable for use in explaining example operations of embodiments of the invention. The computer system environment 100 includes a first data communications device 110 configured according to embodiments of the invention to performing load balancing techniques for a web site 105. The environment 100 also includes a computer network 101 that couples the first data communications device 110 to a second data communications device 130. A first computer system 140, such as a client computer system, couples to the computer network 101 via the second data communications device 130 and can send messages 115-1 such as content requests to the web site 105. The second data communications device 130 operates an insertion manager 135 that is capable of inserting extra data 160 into the messages 115-1 transmitted by the first computer system 140 over the computer network 101 to the web site 105. The extra data 118 allows the load balancing techniques of this invention to select one of the second computer systems 121-1 through 121-N, 122-1 through 122-N or 123-1 through 123-N (i.e., to chose a server with one of the groups of servers 121, 122, 123) with in the web site 105 to process the messages 115.

In this example, the web site 105 includes collections or groups of second computer systems 120, 121 and 122, which may be groups of server computer systems or "server farms" capable of responding to messages 115-2. The messages 115-2 can be content requests for data or may be connection establishment messages (e.g., TCP SYN messages) from client computer systems such as the first computer system 140. Each group of second computer systems 120, 121 and 122 is associated with a respective demographic server 151, 152 and 153. Each demographic server 151, 152 and 153 includes access to a respective database of demographic information 161, 162 and 163. The first data communications device 110 operates as a load balancer for the web site 105 and is configured with a message manager 150 that operates according to embodiments of the invention as explained herein.

Referring now to FIG. 1 to illustrate an example operation of embodiments of the invention, the second data communications device 130 can operate as part of an ISP facility that provides Internet access to the first computer system 140. Generally, the second data communications device 130 is capable of operating the insertion manager 135 to insert extra data 118 into packets 115-1 generated by the first computer system (i.e., a client) that are destined for the web site 105 (i.e., that are to be processed by one of the second computer systems 120, 121, 122). The second data communications device 130 within the ISP facility can be configured to have access to demographic data 160 that contains demographic information associated with users of client computer systems, such as a user of the first computer system 140.

As an example, the demographic data 160 can include customer information related to each customer or user for which the ISP facility provides Internet access. For a particular client computer system 140, such data 160 can include user information for that client (e.g., based upon that client's network address or based upon login information provided by the user) that identifies, for example, the client's name, address, personal interests, hobbies, geographic or location information for that client computer system such as a zip code or phone number, or any other information. The demographic data 160 can collectively include all or portions of the aforementioned types of information and can be stored in a database of demographic data 160 within the ISP facility.

When a user connects to the Internet via the ISP facility, that second data communications device 130 handling that user connection can associate all TCP connections made by that user to a particular record of demographic data 160 (i.e., that users demographic information). Accordingly, upon detection of a connection establishment message (e.g., a TCP SYN 115-1) that is propagating through the second data communications device 130 towards a particular web site, such as the web site 105, the second data communications device 130 operating within the ISP facility can transmit (as shown by path 125) all or a portion of the demographic information 160 for that user attempting that connection to one of the demographic servers 161, 162, 163 associated with the web site 105. In other words, if the web site 105 is equipped with demographic servers 151, 152, and 153, one (or more) of such servers can receive a copy of that users demographic data 160 from the second data communications device 130, as shown by transmission path 125. A protocol such as the Uniform Datagram Protocol (UDP) may be used for this transmission 125. It may be the case that the ISP facility provides free Internet access to the user in exchange for the user providing the detailed (and personal) demographic data 160. The web site 105 might have an agreement with the ISP facility to pay for user demographic data 160 to allow the web site to provided targeted advertising to the users. Accordingly, the second data communications device 130 can detect user attempts to access such web sites 105 and can allow this transaction 125 to take place out-of-band from the messages 115 such that one of the demographic servers (153 in this example in FIG. 1) in the web site 105 is provided with all or a portion of the demographic data 160 for a particular user. For a particular user, this transaction 125 might only take place once and the demographic data 163 (i.e., containing demographic data 160 transmitted via path 125 from the second data communications device 130) is cached for later use by server computer systems 120, 121, and 122 of the web site 105.

In addition to providing a copy of all or a portion of the demographic data 160 for a user to a particular demographic server at the web site to which that user is attempting to connect, an insertion manager 135 (e.g., a software or hardware process) operating within the data communications device 130 in the ISP facility can generate a demographic key 118 for that users that the data communications device 130 then inserts into the outbound content request 115-2 (or connection establishment message such as a TCP SYN packet). The demographic key is thus the extra data 118 inserted into a message 115-2 and can be used for load balancing purposes in the first data communications device 110 as will be explained. The data communications device 130 within the ISP facility then transmits the message 115-1 (e.g., a connection establishment message) containing the inserted extra data 118 (i.e., the demographic key in this example) onto the Internet 101 for propagation towards the web site.

The first data communications device 110 advertises the network address the web site 105 and operates as a load balancing device for this site 105. Accordingly, routing protocols operating within the Internet route the message 115-2 containing the extra data 118 over the network 101 to the first data communications device 110 configured according to this example embodiment of the invention. The first data communications device 110 equipped with a message manager 150 thus receives the message 115-2 containing the extra data 118. The first data communications device 110 operates as a load balancer according to embodiments of the invention and can use the demographic key in the extra data 118 to identify which demographic server 151, 152, 153 in the web site 1105 maintains the demographic data 161, 162, 163 that has the specific demographic data 160 (transferred via UDP) for a user associated with the message 115-2. In this example, the web site 105 is large and there are groups or "farms" of server computer systems 120, 121, and 122 each having an associated respective demographic server 161, 162, and 163. These groups 120, 121 and 122 may be actually physically distributed across a large geographical area, such as across a continent or around the world. The demographic servers 151, 152 and 153 are each associated with a respective group 121, 122 and 123 from which individual respective server computer systems 120, 121, 122 (i.e., within the group) can obtain demographic information 160 for use in processing messages 115 received on connections from client computer systems 140.

In this example configuration, the message manager 150 operating in the first data communications device 110 operates as a load balancing device and analyzes the demographic key 118 which is inserted as extra data into the connection establishment message 115-2 in order to determine which group of server computer systems 120, 121, 122 that message 115-2 should be routed to. The chosen group of server computer systems corresponds to those servers associated with the demographic server 163 that can be identified by the demographic key 118 contained (i.e., inserted) within the message 115-2. Once a group of servers is chosen, the message manager 150 configured according to embodiments of the invention can perform a secondary load balancing operation to select a particular server (i.e., one of 122-1 through 122-N) from the chosen group of servers 122 and can be assured that the selected server (e.g., 122-2) can properly obtain any required demographic information 160 from the proper demographic server 153 during processing of messages 115 for a client 140 that originates the messages 115.

In this manner, embodiments of the invention are capable of load balancing between different demographic servers 151, 152, 153 based upon the extra data 118 inserted into client message 115. Since the ISP facility operates the second data communications device 130 that provides the demographic information 160 to a chosen demographic server 153 selected from many potential demographic servers available within a particular web site (i.e., one of 151, 152, 153). In addition, during the secondary load balancing technique (e.g., choosing a specific server from a group of servers associated with the chosen demographic server), the demographic key 118 inserted into the message 115-2 can be used by the message manager 150 to select an appropriate server 122-N from a group of servers 122 associated with the chosen demographic server 153 as identified by the extra data 118 (the demographic key in this example). For instance, the demographic key in the extra data 118 might identify that the client 140 that originated the message is always served by "SERVER A" in a group of servers.

Thus, the extra data 118 can be used, in one embodiment of the invention, for a two-stage load balancing process in the data communications device 110. The first stage is in choosing a demographic server 151, 152 and 153, and the second is in choosing a particular server in the group of servers 121, 122 or 123 associated with the chosen demographic server.

The aforementioned examples illustrate detailed configurations of certain embodiments of the invention that allow server selection (i.e., load balancing) amongst demographic servers and also allow selection of a particular server within a web site based upon inserted information. It is to be understood that the aforementioned example description of the operation of these embodiments of the invention are not meant to be limiting. As an example, it is not required that the extra data is inserted into a connection establishment message. In another configuration, the ISP facility may wait until receipt, from a client computer system, of a message containing a URL encoded within an HTTP GET request. The second data communications device 130 may then insert the extra data 118 into the content request. In this manner, the ISP facility can be certain of what content is being requested by the client computer system 140 and can select an appropriate server 120, 121, 122.

Figure 2:
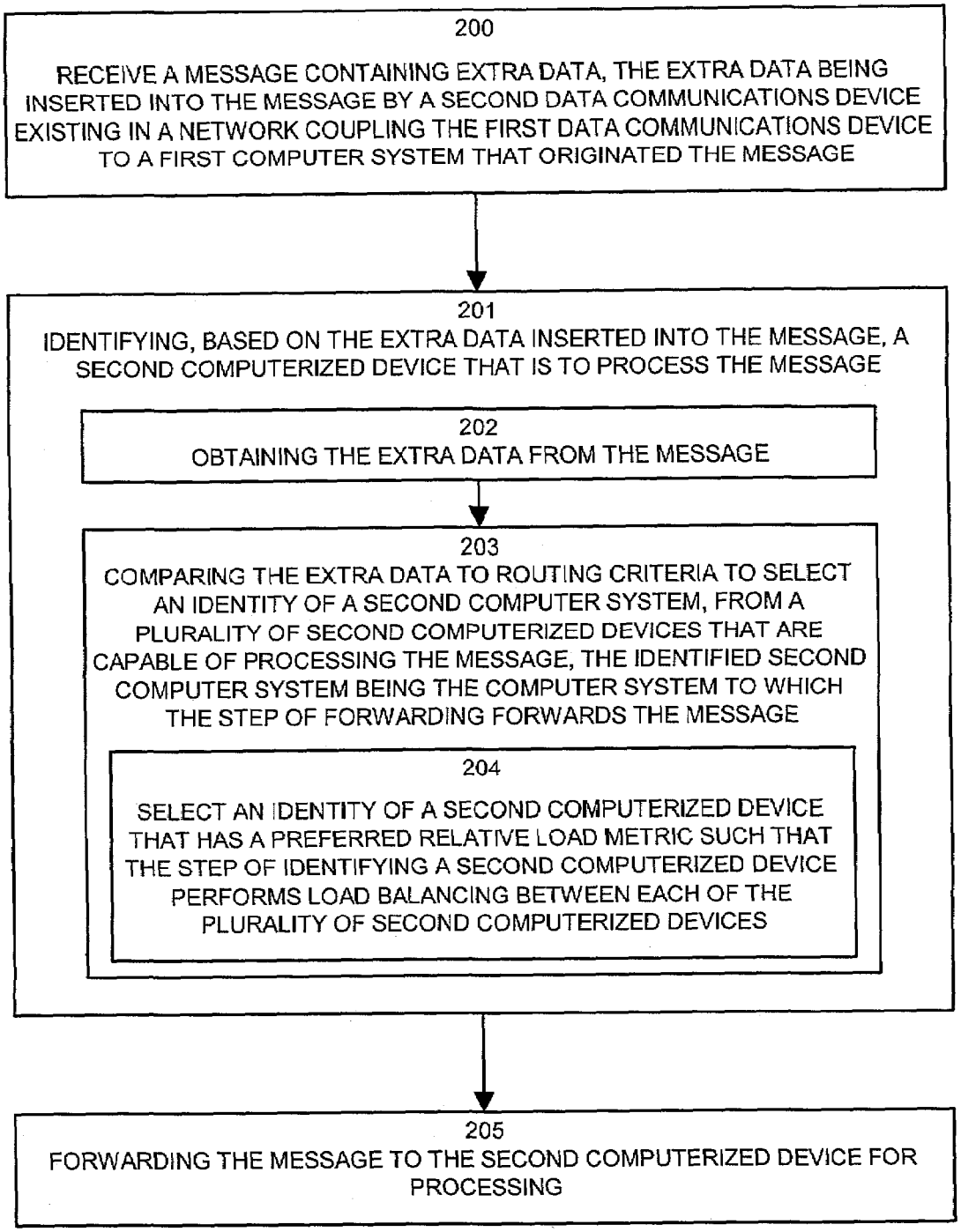
FIG. 2 is a flow chart of processing steps performed by a data communications device equipped with a message manager configured according to one embodiment of the invention.

FIG. 2 is a flow chart of processing steps which illustrate the processing performed by a first data communications device 110 configured with a message manager 150 in accordance with one example embodiment of the invention.

In step 200, the message manager 150 receives a message 115 containing extra data 118. The extra data 118 is (i.e., was previously) inserted into the message 115 by a second data communications device 130 existing in a network 101 that couples the first data vacations device 110 to a first computer system 140 that originated the message 115.

Next, in step 201, the message manager 150 identifies, based on the extra data 118 inserted into the message 115, a second computerized device (i.e., one of the server computer systems 120, 121 or 122 in FIG. 1) that is to process the message 115. The details of one example embodiment of the invention to perform the general operation recited in step 201 are shown in steps 202 through 204.

In step 202, the message manager 150 obtains the extra data 118 from the message 115. As discussed in the example embodiment presented above, the extra data 118 may be demographic information or any other information that the insertion manager 135 operating within the second data communications device 130 inserts into the message 115 produced by the client computer system 140. The insertion of the extra data 118 by the second data communications device 130 allows the first data communications device 110 to perform a load balancing server selection technique according to embodiments of the invention as explained herein.

In step 203, the message manager 150 compares the extra data 118 to routing criteria to select an identity of a second computer system 120, 121 or 122 from a plurality of second computer systems that are capable of processing the message 115. The identified second computer system is the computer system to which the first data communications device 110 will forward the message 115. Accordingly, as messages arrive at the first data communications device 110 from multiple first computer systems 140, each message 115 can contain extra data 118 that can be used to load balance the messages between the server computer systems 120, 121 and 122.

As explained in the aforementioned example embodiment, groups of server computer systems 120, 121 and 122 are associated with respective demographic servers 151, 152 in 153. Prior to selection of a server computer system by the first data communications device 110, the second data communications device that inserted the extra data 118 into each of the messages 115 will have provided demographic data to one of the demographic servers 151, 152 in 153. In one example configuration of the invention, the extra data 118 includes demographic information that identifies which particular demographic server received demographic data associated with a user that generated the message 115. Accordingly, the extra data 118 can be used to identify which group of server computer systems the message should be routed towards in order to assure that the selected server computer system has access to the appropriate demographic server which stores or otherwise has access to the appropriate demographic information 160 associated with the user that generated the message 115.

In step 204, the message manager 150 selects an identity of a specific second computerized device 120, 121 and 122 (i.e., selects a particular server from the selected group of servers associated with the appropriate demographic server). The selected second computer system has a preferred relative load metric such that the step of identifying performs load balancing between each of the second computerized devices in the group of computer systems 120, 121 or 122 associated with the appropriate demographic server. In other words, in step 204, once the group of server computer systems associated with the correct demographic server has been selected, the message manager 115 can perform a secondary load balancing technique in order to load balance the message to one of the servers in the correct group. The extra data 118 can be used to indicate what server is to be selected. Accordingly, if multiple messages 115 from different clients 140 arrive at the first data communications device 110 and each contains extra data 118 that identifies the same group of server computer systems associated with a particular demographic server, then the message manager 150 can distribute or load balance these messages between each of the servers in that group such that no one particular server is overloaded or burdened by all messages 115 associated with the same demographic server.

Next, in step 205, the message manager 150 forwards the message 115 to the selected second computerized device for appropriate processing. In this manner, messages 115 containing extra data 118 inserted by devices other than the first computer system (i.e., a client) that generated the message 115 can be load balanced within a web site 105.

Figure 3:
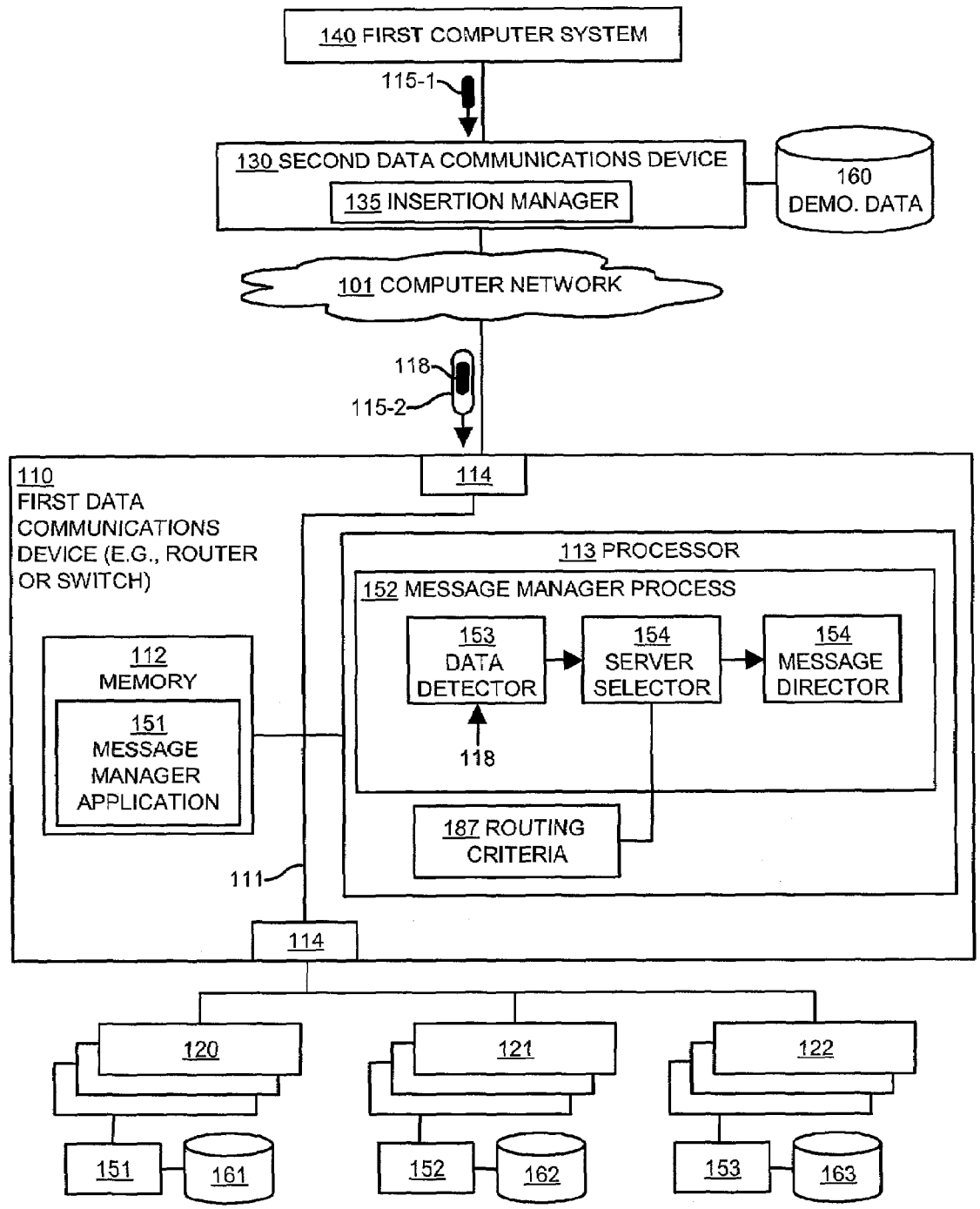
FIG. 3 illustrates an example architecture and data flow of operation of an message manager within a data communications device configured according to one example embodiment of the invention.

FIG. 3 illustrates a more detailed architecture of a first data communications device 110 configured in accordance with one example embodiment of the invention. The components illustrated in the FIG. 3 that are external to the first data communications device 110 have been previously discussed with respect to the example computer system environment 100 illustrated in FIG. 1.

In FIG. 3, the first data communications device 110 in this example embodiment of the invention includes an interconnection mechanism 111 such as a data bus or circuitry that interconnects a memory 112, a processor 113 and one or more communications interfaces 114. The memory 112 may be any type of volatile or non-volatile memory or storage system such as computer memory (e.g., random access memory (RAM), read-only memory (ROM), firmware or another type of memory), disk memory (e.g., hard disk, floppy disk, optical storage, removable media, and so forth). The memory 112 is encoded with logic instructions and/or data that form a message manager application 151 configured according to embodiments of the invention. In other words, the message manager application 151 represents software code, instructions and/or data that reside within memory or storage 112 or within any computer readable medium accessible to the data communications device 110. The processor 113 represents any type of circuitry or processing device such as a central processing unit or application-specific integrated circuit (ASIC) that can access the message manager application 151 encoded within the memory 112 over the interconnection mechanism 111 in order to execute, run, interpret, operate or otherwise perform the message manager application 141 logic instructions. Doing so forms a message manager process 152. In other words, the message manager process 152 (represented in FIG. 1 generally as the message manager 150) represents one or more portions of the logic instructions of the message manager application 151 while being executed, run, interpreted or otherwise performed on, by, or in the processor 113 within the data communications device 110.

The insertion manager process 152 includes a data detector 153, a server selector 154 and a message director 154. Generally, the data detector 153 and detects messages 115-2 that contain extra data 118 and passes a copy of the extra data 118 to the server selector 154. The server selector 154 compares the extra data 118 to routing criteria 187 in order to choose a particular server computer system 120, 121 or 122. The processing of the server selector 154 may include first determining which demographic server 151, 152 or 153 the extra data 118 relates to and then, based in this determination, identifying a specific server computer system from the groups of server computer systems 120, 121 and 122 that are associated with a specific demographic server to which the extra data 118 relates. Once the server computer system is selected, the message director 154 forwards the message 115-2 to the specifics selected server computer system.

Figure 4:
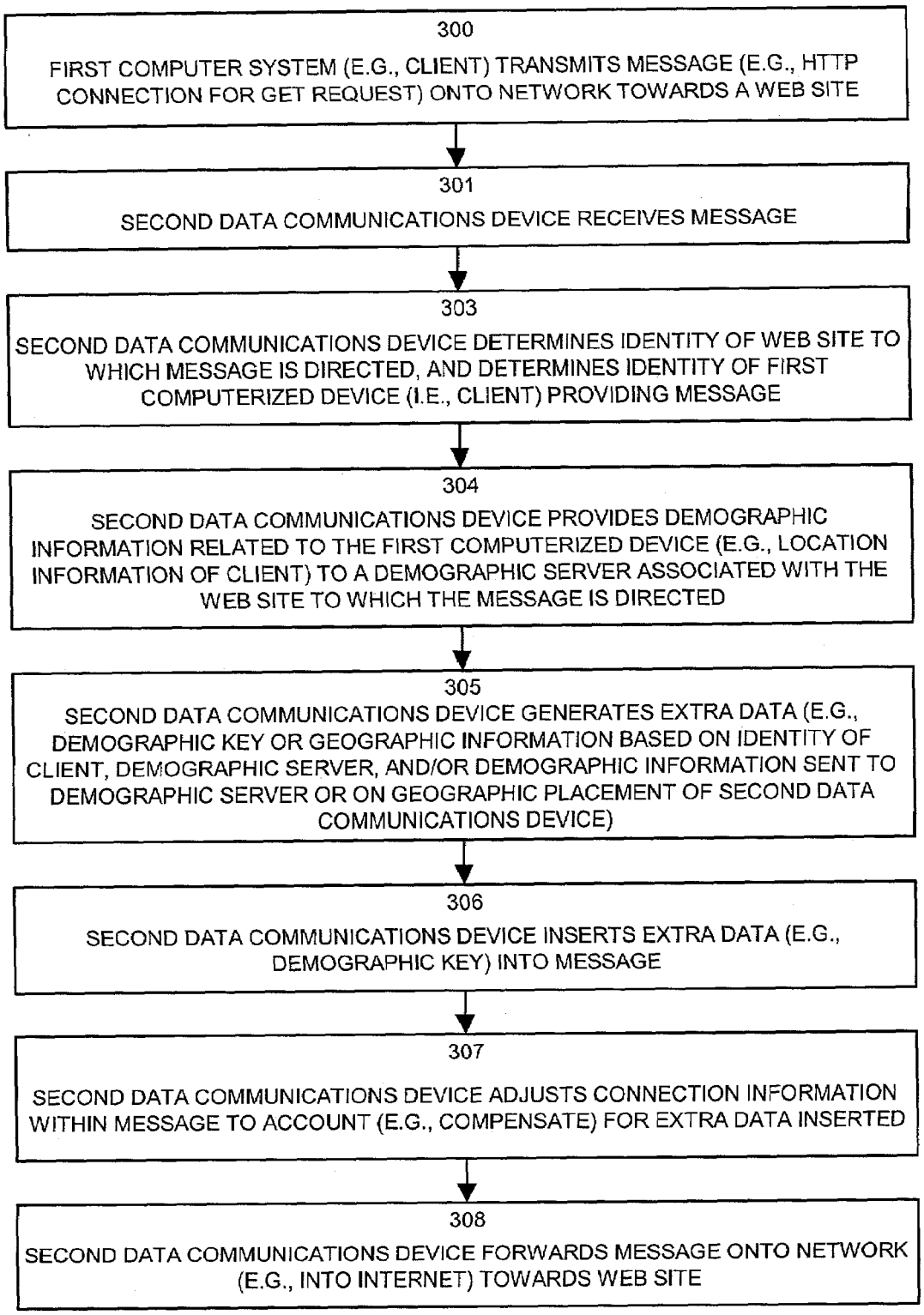
FIG. 4 illustrates a more detail example operation of a second data communications device that inserts data into a message or packet in a communication session.

FIG. 4 is a flow chart of processing steps performed by a second data communications device 130 in order to insert extra data 118 such as demographic information 160 into a message 115 sent from a client computer system to a web site equipped with the first data indications device 110 configured in accordance with one example embodiment of the invention.

In step 300, the first computer system 140 transmits a message 115-1 such as an HTTP GET request message onto the network towards a web site 105 (i.e., to be processed by a server associated with a web site).

In step 301, the second data communications device 130 receives the message 115-1.

In step 302, the second data communications device determines the identity of the web site 105 to which the message 115-1 is directed and also determines the identity of the first computerized device 140 (e.g., the client, via a source network address) providing the message 115-1.

In step 303, the second data communications device 130 provides demographic information 160 which is related to the first computer system 140 to a demographic server 151, 152 or 153 associated with a web site 105 to which the message 115-1 is directed. The selection of a particular demographic server from a number of available demographic servers can be done in a round-robin manner or using any other technique. The demographic information 160 is provided via an out of band transmission 125 and this may only be required to be performed once such that a single demographic server 151, 152 or 153 receives demographic data 160 for a particular user of a particular client computer system once and stores this information for a period of time thereafter for any future accesses that that user a performed to that web site 105.

In step 304, the second data communications device 130 generates extra data 118 for insertion into the message 115-1. The extra data may be, for example, a demographic key and/or geographic information (e.g., the zip code city, town, state, county, phone number or other information identifying a location of the first client computer system 140) based on the identity of the client 140, or based on the selection of the demographic server (in step 303).

In step 305, the second data communications device inserts the extra data 118 such as the demographic key into the message 115-1 to produce the message 115-2.

In step 306, the second data communications device 130 adjusts or modifies connection information within the message 115-2 to account or compensate for the extra data 118 inserted in step 305. As discussed in the aforementioned referenced patent application, this can involve modifying TCP sequence and acknowledgment number information within the packet of data 115-2 in order to adjust these sequence and acknowledgement numbers to account for the insertion of the extra data 118. In doing so, a subsequent device such as a server computer system that receives the message will be able to maintain a connection associated with the message 115 even though the extra data 118 was inserted into the message.

In step 307, the second data communications device 130 forwards the message 115-2 (that now contains the extra data 118 that includes load balancing information) onto the network 101 towards the web site 105. The message 115-2 thus propagates through the network 101 to the first data communications device 110 configured in accordance with embodiment of the invention.

Figure 5:
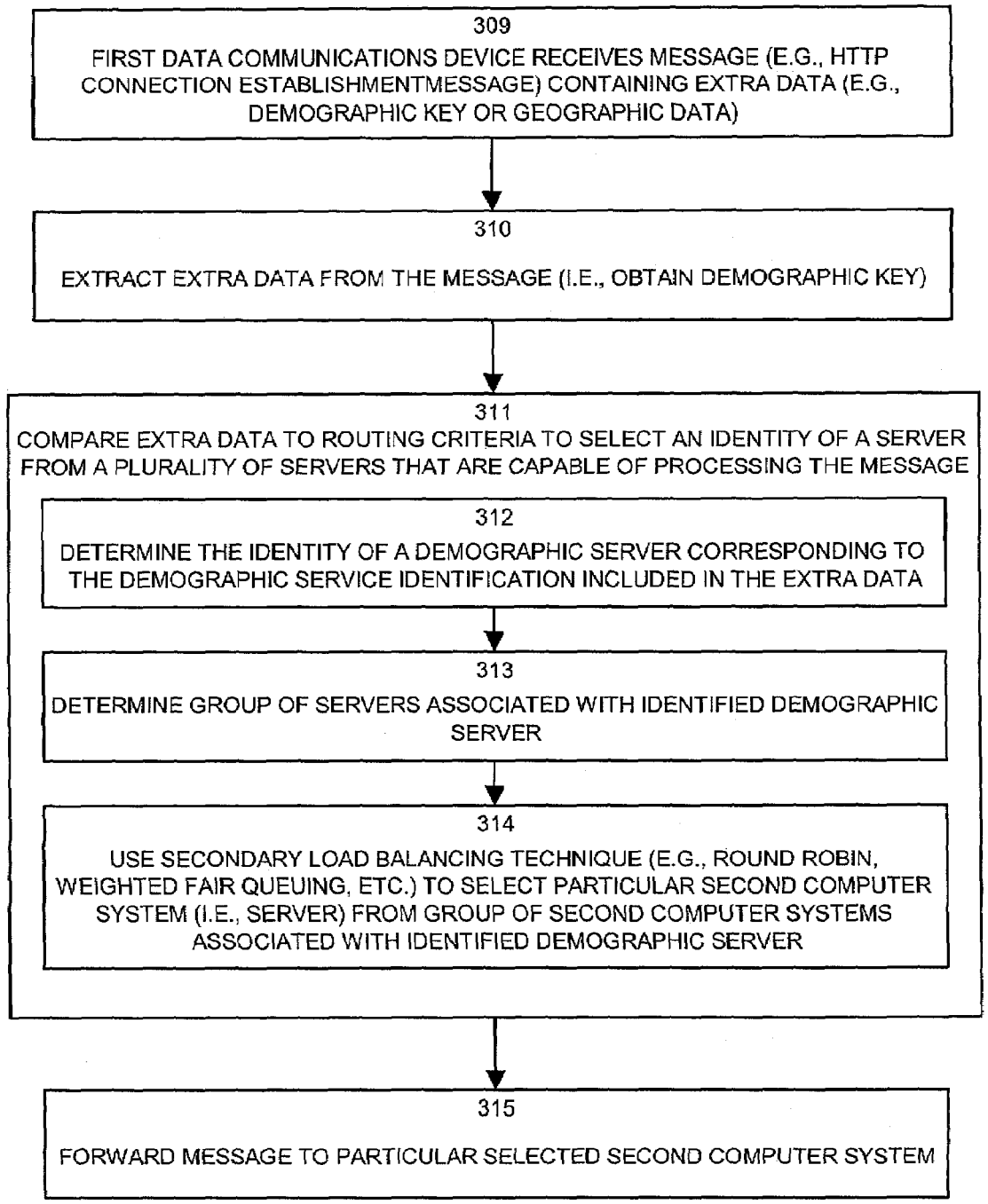
FIG. 5 is a flow chart showing the details of operation of a data communications device operating a message manager configured according to one example embodiment of the invention.

FIG. 5 is a flow chart of processing steps that illustrate operations of the message manager process 152 (FIG. 3) configured to operate according to one example embodiment of the invention.

In step 309, the first data communications device 110 operating the message manager process 152 receives the message 115-2 containing the extra data 118. The message 115 may be, for example, a connection establishment message for a TCP connection (e.g., TCP SYN message) or may be any other type of message such as an HTTP GET request message containing a URL of content to be obtained from the web site 105. The extra data 118 within the message 115-2 can be, as explained in the previous examples, a demographic server identification of key or other information that the message manager process 152 can utilize in order to perform the load balancing technique for server selection within the web site 105.

In step 310, the data detector 153 operating within the message manager process 152 extracts the extra data 118 from the message 115-2. This may entail extracting or obtaining the demographic key that was inserted by the insertion manager 135 as explained with respect to the processing in FIG. 4.

In step 311, the message manager process 152 operates the server selector 154 to compare the extra data 118 to routing criteria 187 to select an identity of a server computer system from a plurality of server computer systems 120 through 122 that are capable of processing the message 115-2. Details according to one embodiment of the invention to select a specific server computer system within the web site 105 are illustrated in processing steps 312 through 314.

In step 312, the server selector 154 operating within the message manager process 152 determines the identity of a demographic server 151 through 153 that corresponds to the demographic service identification or key included in the extra data 118. In other words, the extra data 118 inserted into the message 115-2 by the insertion manager 135 can be decoded or otherwise analyzed by the server selector 154 within the message manager process 152 in order to obtain the identity of the specific demographic server to which demographic information 160 was forwarded on behalf of the client computer system 140 that originated the message 115-1.

In step 313, the server selector 154 operating within the message manager process 152 determines or chooses a specific group of servers 120, 121 or 122 associated with the demographic server identified in step 312. Returning attention briefly to the example illustration in FIG. 1, recall that the insertion manager 135 operating within the second data communications device 130 transferred demographic data 160 via communications path 125 to the demographic data database 163 associated with the demographic server 153. In addition, when the insertion manager 135 inserts the extra data 118 into the message 115-2, the extra data 118 can include a demographic service identification or key that can be decoded by the message manager 150 in step 313 in order to identify that the group of second computer systems (i.e., web servers) 122-1 through 122-N are those servers that are able to obtain demographic information 163 from the demographic server 153. Accordingly, in step 313, the message manager process 152 is able to identify that group of second computer systems (i.e., servers) 122 associated with that demographic server 153.

In step 314, using a secondary load balancing technique such as round robin, weighted fair queuing, or another such technique, the server selector 154 selects a specific server from the group of second computer systems 122 associated with the identified demographic server 153. The routing criteria 187 may be used for this purpose and may indicate such things as various processing loads being experienced by each server 122-1 through 122-N in the selected group of servers 122. In other words, once step 313 has been processed in order to determine a group of servers that are associated with the demographic key within the extra data 118, and thus a set of servers have been identified which are capable of processing the message 115-2 (since those severs have access to the proper demographic data), the message manager process 152 performs step 314 in order to select a specific server computer system from the group of available sever computer systems 122 using a server load balancing technique. The extra data 118 inserted into the message 115-2 can be used for this purpose.

As an example, since the insertion manager 135 (FIG. 1) decides which demographic server is to obtain the demographic data 160 related to the user and client computer system 140 that originated the message 115, the demographic key which is part of the extra data 118 inserted by the insertion manager 135 into the message 115-2 can identify not only the identity of the demographic server chosen by the insertion manager 135, but also can identify, for example, a sequence or number of times that this insertion manager 135 has chosen this particular demographic server (e.g., 153) over a period of time. This information may be useful in step 314 so that the server selector 154 can be sure to choose a different server computer system 122 from the available set of server computer systems capable of processing the message (i.e., capable of accessing the demographic server 153).

Next, in step 315, the message director 155 forwards the message to the particular selected second computer system 122-N chosen from the group of second computer systems (i.e., servers) 122-1 through 122-N. Upon receipt of the message 115-2, the particular selected server computer system 122-N can also use the extra data 118 containing the demographic service identification or key to contact the demographic server in order to obtain the demographic information 160 provided to that demographic server 153 by the insertion manager 135 via transmission 125. In other words, according to this example embodiment of the invention, the extra data 118 can be used by the message manager 150 to perform a load balancing technique for selection of server computer systems and can also be used by those server computer systems themselves in order to obtain the appropriate demographic data 160 from a respectively associated demographic server. This allows the appropriate server computer systems 120 through 122 to respond, for example, to web page requests with customized web pages based upon the demographic data of the user or client computer system 140 which generated the message 115 containing the request for data in the first place. Since the demographic data 160 can contain location information related to the first computer system 140, the response from the server computer system can include customized content such as local advertising for merchants that are relatively close in geographic proximity to the first computer system 140.

Those skilled in the art will understand that there can be many variations made to the embodiments explained above while still achieving the same objective of those embodiments and the invention in general. Such variations are intended to be covered by the scope of this invention. As such, the foregoing description of embodiments of the invention are not intended to be limiting. Rather, any limitations to the invention are presented in the following claims.

What is claimed is:

1. In a first data communications device, a method for load balancing messages, the method comprising the steps of:

receiving a message containing extra data, the extra data being inserted into a payload of the message by a second data communications device existing in a network coupling the first data communications device to a first computerized device that originated the message, wherein receiving a message comprises (i) extracting the extra data from the message, and (ii) adjusting the connection information included within the message such that the message no longer contains the extra data and is reverted to a state that existed before the second data communications device inserted the extra data into the message, wherein the payload is transmitted by the first computerized device;

identifying, based on the extra data inserted into the message, a second computerized device that is to process the message, wherein identifying a second computerized device comprises (i) obtaining the extra data from the message, the extra data inserted into the message by the second data communications device including a demographic server identification that identifies a demographic server that maintains demographic information associated with the first computerized device that originated the message, and (ii) comparing the extra data to routing criteria to select an identity of a second computerized device, from a plurality of second computerized devices that are capable of processing the message, the identified second computerized device being a device to which the step of forwarding forwards the message, the routing criteria indicating groups of second computerized devices of the plurality of second computerized devices associated with respective demographic servers wherein comparing the extra data comprises (a) identifying a demographic server corresponding to the demographic server identification included in the extra data, (b) selecting, from the groups of second computerized devices indicated by the routing criteria, a specific group of second computerized devices associated with the identified demographic server, and (c) identifying one second computerized device from the selected specific group of second computerized devices associated with the demographic server corresponding to the demographic server identification included in the extra data, such that the step of forwarding forwards the message to the identified second computerized device; and forwarding the message, without the extra data, to the second computerized device for processing, the message including connection information that the second data communications device modified during the process of inserting the extra data such that a connection over which the message is transmitted between the first computerized device and the second computerized device is not disrupted by the insertion of the extra data into the message by the second data communications device.

2. The method of claim 1 wherein:

the message is a connection establishment message originated by a client browser application operating on the first computerized device;

the extra data includes a load balancing characteristic associated with the first computerized device that the second data communications device inserts into the connection establishment message;

and wherein the step of identifying a second computerized device that is to process the message comprises the steps of:

utilizing the load balancing characteristic included in the extra data to select the second computerized device from a plurality of second computerized devices that are capable of processing the message, the second computerized device being a computerized device to which the step of forwarding forwards the message in order to establish a connection with the first computerized device.

3. The method of claim 2 wherein the extra data is geographic data that indicates a geographic location associated with the first computerized device and wherein the step of identifying selects a second computerized device that is geographically preferred to handle a connection from the first computerized device.

4. The method of claim 1 wherein:

the routing criteria is load balancing information that indicates a relative load metric for each of the second computerized devices in the plurality of second computerized devices; and wherein the step of comparing comprises the step of:

selecting an identity of a second computerized device that has a preferred relative load metric such that the step of identifying a second computerized device performs load balancing between each of the plurality of second computerized devices.

5. The method of claim 1 wherein the extra data inserted into the message by the second data communications device includes a demographic key associated with the first computerized device, the demographic key corresponding to demographic information related to the first computerized device that the first data communications device forwards to the demographic server corresponding to the demographic server identification contained in the extra data.

6. A data communications device for performing load balancing, the data communications device comprising:

at least one communications interface;

a memory;

a processor; and an interconnection mechanism coupling the at least one communications interface, the memory and the processor;

wherein the memory is encoded with a message manager application that when performed on the processor, produces a message manager process that causes the computerized device to load balance messages between a plurality of computer systems by performing the operations of:

receiving, via the at least one communications interface, a message containing extra data, the extra data being inserted into a payload of the message by a second data communications device existing in a network coupling the first data communications device to a first computerized device that originated the message, wherein receiving a message comprises (i) extracting the extra data from the message, and (ii) adjusting the connection information included within the message such that the message no longer contains the extra data and is reverted to a state that existed before the second data communications device inserted the extra data into the message, wherein the payload is transmitted by the first computerized device;

identifying, based on the extra data inserted into the message, a second computerized device that is to process the message, wherein identifying a second computerized device comprises (i) obtaining the extra data from the message, the extra data inserted into the message by the second data communications device including a demographic server identification that identifies a demographic server that maintains demographic information associated with the first computerized device that originated the message, and (ii) comparing the extra data to routing criteria to select an identity of a second computerized device, from a plurality of second computerized devices that are capable of processing the message, the identified second computerized device being a device to which the step of forwarding forwards the message, the routing criteria indicating groups of second computerized devices of the plurality of second computerized devices associated with respective demographic servers wherein comparing the extra data comprises (a) identifying a demographic server corresponding to the demographic server identification included in the extra data, (b) selecting, from the groups of second computerized devices indicated by the routing criteria, a specific group of second computerized devices associated with the identified demographic server, and (c) identifying one second computerized device from the selected specific group of second computerized devices associated with the demographic server corresponding to the demographic server identification included in the extra data, such that the step of forwarding forwards the message to the identified second computerized device; and forwarding, via the at least one communications interface, the message, without the extra data, to the second computerized device for processing, the message including connection information that the second data communications device modified during the process of inserting the extra data such that a connection over which the message is transmitted between the first computerized device and the second computerized device is not disrupted by the insertion of the extra data into the message by the second data communications device.

7. The data communications device of claim 6 wherein:

the message is a connection establishment message originated by a client browser application operating on the first computerized device;

the extra data includes a load balancing characteristic associated with the first computerized device that the second data communications device inserts into the connection establishment message; and wherein when the message manager performs the step of identifying a second computerized device that is to process the message, the message manager performs the step of:

utilizing the load balancing characteristic included in the extra data to select the second computerized device from a plurality of second computerized devices that are capable of processing the message, the second computerized device being a computerized device to which the step of forwarding forwards the message in order to establish a connection with the first computerized device.

8. The data communications device of claim 7 wherein the extra data is geographic data that indicates a geographic location associated with the first computerized device and wherein the step of identifying selects a second computerized device that is geographically preferred to handle a connection from the first computerized device.

9. The data communications device of claim 6 wherein:

the routing criteria is load balancing information that indicates a relative load metric for each of the second computerized devices in the plurality of second computerized devices; and wherein when the message manager performs the step of comparing, the message manager performs the step of:

selecting an identity of a second computerized device that has a preferred relative load metric such that the step of identifying a second computerized device performs load balancing between each of the plurality of second computerized devices.

10. The data communications device of claim 6 wherein the extra data inserted into the message by the second data communications device includes a demographic key associated with the first computerized device, the demographic key corresponding to demographic information related to the first computerized device that the first data communications device forwards to the demographic server corresponding to the demographic server identification contained in the extra data.

11. A computer program product having a computer-readable medium including computer program logic encoded thereon that, when performed on a processor in a computerized device having a coupling of a memory, a processor, and at least one communications interface provides a method for load balancing messages by causing the computerized device to perform the operations of:

receiving a message containing extra data, the extra data being inserted into a payload of the message by a second data communications device existing in a network coupling the first data communications device to a first computerized device that originated the message, wherein receiving a message comprises (i) extracting the extra data from the message, and (ii) adjusting the connection information included within the message such that the message no longer contains the extra data and is reverted to a state that existed before the second data communications device inserted the extra data into the message, wherein the payload is transmitted by the first computerized device;

identifying, based on the extra data inserted into the message, a second computerized device that is to process the message, wherein identifying a second computerized device comprises (i) obtaining the extra data from the message, the extra data inserted into the message by the second data communications device including a demographic server identification that identifies a demographic server that maintains demographic information associated with the first computerized device that originated the message, and (ii) comparing the extra data to routing criteria to select an identity of a second computerized device, from a plurality of second computerized devices that are capable of processing the message, the identified second computerized device being a device to which the step of forwarding forwards the message, the routing criteria indicating groups of second computerized devices of the plurality of second computerized devices associated with respective demographic servers wherein comparing the extra data comprises (a) identifying a demographic server corresponding to the demographic server identification included in the extra data, (b) selecting, from the groups of second computerized devices indicated by the routing criteria, a specific group of second computerized devices associated with the identified demographic server, and (c) identifying one second computerized device from the selected specific group of second computerized devices associated with the demographic server corresponding to the demographic server identification included in the extra data, such that the step of forwarding forwards the message to the identified second computerized device; and forwarding the message, without the extra data, to the second computerized device for processing, the message including connection information that the second data communications device modified during the process of inserting the extra data such that a connection over which the message is transmitted between the first computerized device and the second computerized device is not disrupted by the insertion of the extra data into the message by the second data communications device.

12. A data communications device capable of load balancing messages, the data communications device comprising:

at least one communications interface;

a memory;

a processor; and an interconnection mechanism coupling the at least one communications interface, the memory and the processor;

wherein the memory is encoded with an message manager application that when performed on the processor, produces a message manager process that causes the computerized device to load balance message between a plurality of computer systems by providing means including:

means for receiving a message containing extra data, the extra data being inserted into a payload of the message by a second data communications device existing in a network coupling the first data communications device to a first computerized device that originated the message, wherein receiving a message comprises (i) means for extracting the extra data from the message, and (ii) means for adjusting the connection information included within the message such that the message no longer contains the extra data and is reverted to a state that existed before the second data communications device inserted the extra data into the message, wherein the payload is transmitted by the first computerized device;

means for identifying, based on the extra data inserted into the message, a second computerized device that is to process the message, wherein identifying a second computerized device comprises (i) means for obtaining the extra data from the message, the extra data inserted into the message by the second data communications device including a demographic server identification that identifies a demographic server that maintains demographic information associated with the first computerized device that originated the message, and (ii) means for comparing the extra data to routing criteria to select an identity of a second computerized device, from a plurality of second computerized devices that are capable of processing the message, the identified second computerized device being a device to which the step of forwarding forwards the message, the routing criteria indicating groups of second computerized devices of the plurality of second computerized devices associated with respective demographic servers wherein means for comparing the extra data comprises (a) means for identifying a demographic server corresponding to the demographic server identification included in the extra data, (b) means for selecting, from the groups of second computerized devices indicated by the routing criteria, a specific group of second computerized devices associated with the identified demographic server, and (c) means for identifying one second computerized device from the selected specific group of second computerized devices associated with the demographic server corresponding to the demographic server identification included in the extra data, such that the step of forwarding forwards the message to the identified second computerized device; and means for forwarding the message, without the extra data, to the second computerized device for processing, the message including connection information that the second data communications device modified during the process of inserting the extra data such that a connection over which the message is transmitted between the first computerized device and the second computerized device is not disrupted by the insertion of the extra data into the message by the second data communications device.

* * * * *